United States Patent [19]
Leger

[11] Patent Number: 5,978,504
[45] Date of Patent: *Nov. 2, 1999

[54] FAST PLANAR SEGMENTATION OF RANGE DATA FOR MOBILE ROBOTS

[75] Inventor: Patrick C. Leger, Pittsburgh, Pa.

[73] Assignee: Carnegie Mellon University, Pittsburgh, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/801,974

[22] Filed: Feb. 19, 1997

[51] Int. Cl.$^6$ ........................................... G06K 9/00
[52] U.S. Cl. .................... 382/153; 382/154; 382/199; 382/103; 356/376
[58] Field of Search ...................... 382/103, 131, 382/284, 107, 106, 199; 901/47; 356/376

[56] References Cited

U.S. PATENT DOCUMENTS

| | | | |
|---|---|---|---|
| 5,093,869 | 3/1992 | Alves et al. | 382/103 |
| 5,302,997 | 4/1994 | Cocca | 354/432 |
| 5,471,541 | 11/1995 | Burtnyk et al. | 382/153 |
| 5,525,882 | 6/1996 | Asaka et al. | 901/47 |
| 5,621,827 | 4/1997 | Uchiyama et al. | 382/307 |

FOREIGN PATENT DOCUMENTS

| | | | |
|---|---|---|---|
| 617296 | 9/1994 | France | G01S 11/12 |
| 95/15254 | 6/1995 | Germany | B29C 67/00 |

OTHER PUBLICATIONS

Schiele et al. "A comparison of position estimation techniques using occupancy grids" Proc. of the 1994 IEEE International Conference on Robot and Automation vol. 2 pp. 1628–1634, May 1994.

Jiang et al. "Fast range image segmentation using high–level segmentation primitives" Proceedings Third IEEE Workshop on Applications of Computer Vision. pp. 83–88, Dec. 1996.

Jiang et al. "Fast segmentation of range images into planar regions by scan line grouping" Machine Vision and Applications, Tokyo, 7(2) pp. 115–122, 1994.

Schmitt et al. "Fast segmentation of range images into planar regions" Proc. 1991 IEEE Computer Scociety Conference on Computer Vision and Pattern Recongnition pp. 710–711, Jun. 1991.

Silva et al. "3–D data acquisition and scene segmentation syste" Proc. of the 13 th International Conference on Pattern Recognition v3 pp. 563–567, Aug. 1996.

Zhang et al. "A 3D world model builder with a mobile robot" The International Journal of Robotics Research, v11 No. 4 pp. 269–285, Aug. 1992.

*Primary Examiner*—Amelia Au
*Assistant Examiner*—Jingge Wu
*Attorney, Agent, or Firm*—Haverstock, Garrett & Roberts

[57] ABSTRACT

The first step in processing three dimensional range data for a vision system of a robot is feature extraction such as planar segmentation. When the sensors used to obtain the range data are mounted on a platform which moves during data acquisition, inter scanline connectivity cannot be relied upon. Therefore, line segments are detected and merged in each scanline and then line segments of different scanlines are merged to form planes. Both merging steps use a least squares threshold. To speed processing, the viewing area is broken into cells and comparisons are made only between cells adjacent to a cell of interest. The resulting planes undergo conventional hypothesis generation and verification.

34 Claims, 4 Drawing Sheets

Fig_2_

Fig_3_

FAST PLANAR SEGMENTATION OF RANGE DATA FOR MOBILE ROBOTS

TECHNICAL FIELD

The present invention is directed to robot vision systems, and, more particularly, to detecting planes in data obtained using a scanned one-dimensional range sensor.

DESCRIPTION OF THE RELATED ART

There are numerous ways in which robots have been designed to obtain visual data, or equivalent information about their environment. Television cameras, radar, sonar and laser imaging systems have all been used. Many different types of sensors and image recognition techniques have been used. Most techniques are so computationally intensive that processing is slow and usually little information can be obtained quickly about an object. These drawbacks are exacerbated when the sensors are mounted on a mobile platform, such as an automotive vehicle.

Often, in applications where the sensors are mounted on a mobile platform, sensor data is reduced to a single point for each object detected, as is the case in many radar systems. When more detailed information is desired, the platform may be kept as stationary as possible, while information about an object is detected. An example is provided in European Patent Application 617,296, filed Mar. 3, 1994, which limits the points detected to a single plane approximately parallel to the floor of the vehicle at about the height of the headlights. Such systems are adequate for applications such as obstacle avoidance, but are insufficient when the purpose of the sensor is to obtain three-dimensional measurements of an object, such as another vehicle. In many real-world applications, such as sensors mounted on construction equipment, maintaining a stable platform while measurements are obtained is impractical.

SUMMARY OF THE INVENTION

An object of the present invention is to provide a method of extracting planar features from three-dimensional image data quickly.

Another object of the present invention is to extract planar features from three-dimensional image data in a noisy environment, such as a platform which moves during data acquisition.

A further object of the present invention is to combine range data obtained from multiple scanlines into planes spanning the scanlines, without any inter-scanline connectivity.

The above objects are attained by a computer program embodied on a computer-readable medium for analyzing range data from scanlines, including line segment forming code to group data points within a scan line into line segments, line segment merging code to merge each line segment in each scanline with a best fit plane if a merged plane error within a first plane threshold is produced; and plane merging code to merge pairs of planes if a combined plane error within a second plane threshold is produced. The computer program may be executed on a computer system coupled to a scanner mounted on a mobile machine, such as an excavator or other construction equipment. The scanner may be a radar or laser device which generates a plurality of scanlines in a space of interest to obtain three-dimensional points on surfaces in the field of interest.

To obtain the line segments to merge to the best fit plane, adjacent points detected by the scanner in each scanline are connected to form line segments. The line segments in each scanline are merged, provided the resulting line segment has an error within a threshold. The error may be calculated using least squares or other forms of regression. The process continues until all line segments have been merged into other line segments without exceeding the threshold.

Once planes have been formed, each line segment in the subsequent scanlines is merged with the best fit plane, if a threshold is not exceeded by the merged plane which results. Any line segments in a scanline that cannot be merged with a plane are compared with unmerged line segments from previous scanlines and the best possible merge is made to form a new plane if the resulting plane has an error within a threshold.

Normals are calculated for each of the planes. Possible merges of planes with similar normals are calculated after all of the scanlines have been processed. The best possible merge for each plane with those planes having similar normals is made if the combined plane has an error within a threshold. After all possible merges set forth above have been completed, the resulting planes are supplied to conventional object recognition software to perform, e.g., hypothesis generation and verification.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
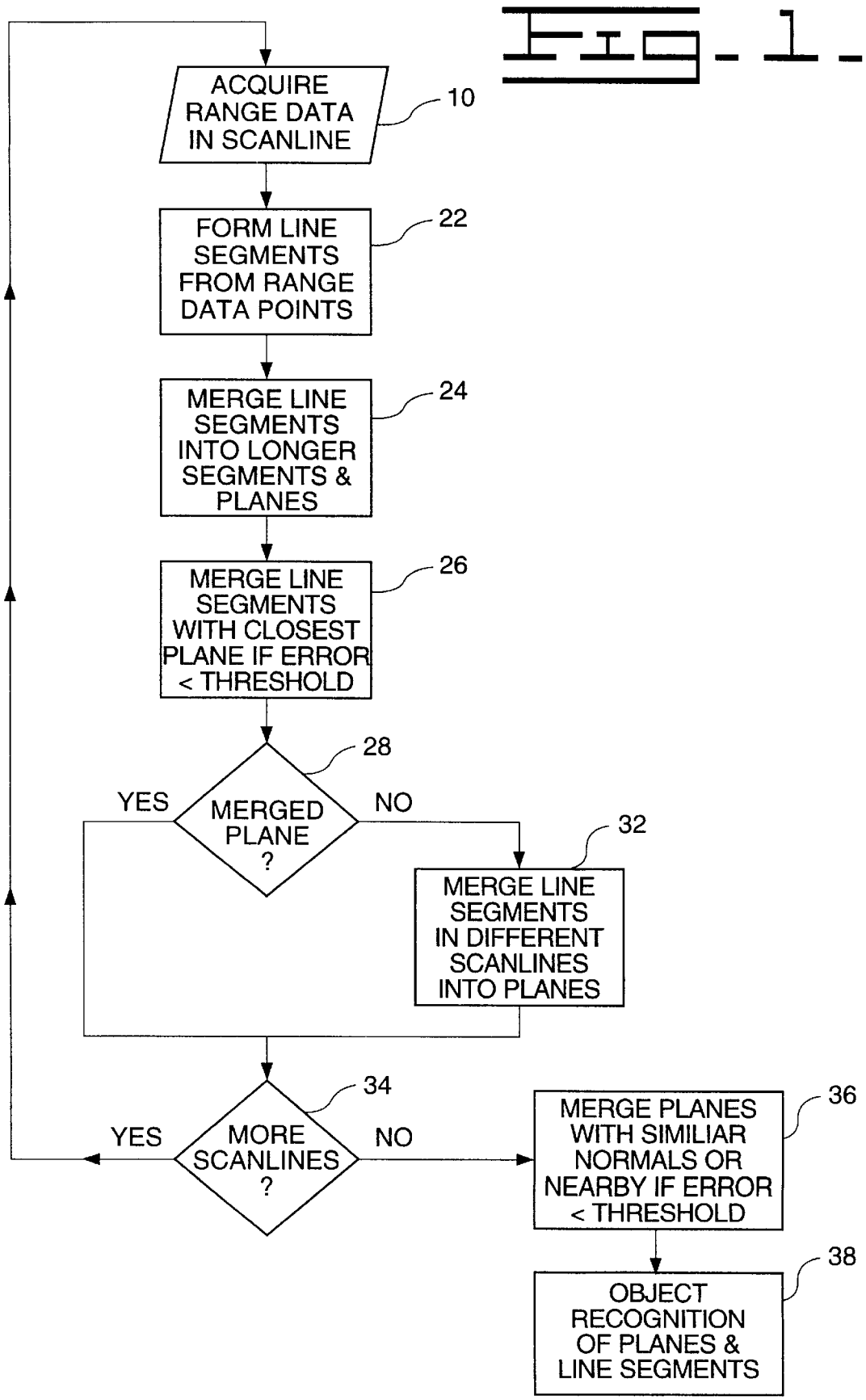
FIG. 1 is a flowchart of a method according to the present invention.

As illustrated in FIG. 1, a method according to the present invention begins with acquiring 10 range data in a scanline. A simplified block diagram of a system that may be used to implement a method according to the present invention is provided in FIG. 2. The scanlines may be obtained from a scanner 12, such as a 5000 LASAR part number 0009-0064 from PERCEPTRON of Farmington Hills, Mich. The method may be executed on a computer system having a processor 14, such as a MIPS R4700 processor on a VME board in a BAJA4700 from HEURIKON of Madison, Wis. or a SILICON GRAPHICS INDIGO or SUN ULTRASPARC, or other suitable data processing equipment for the particular type of robot in which the system is used.

Figure 2:
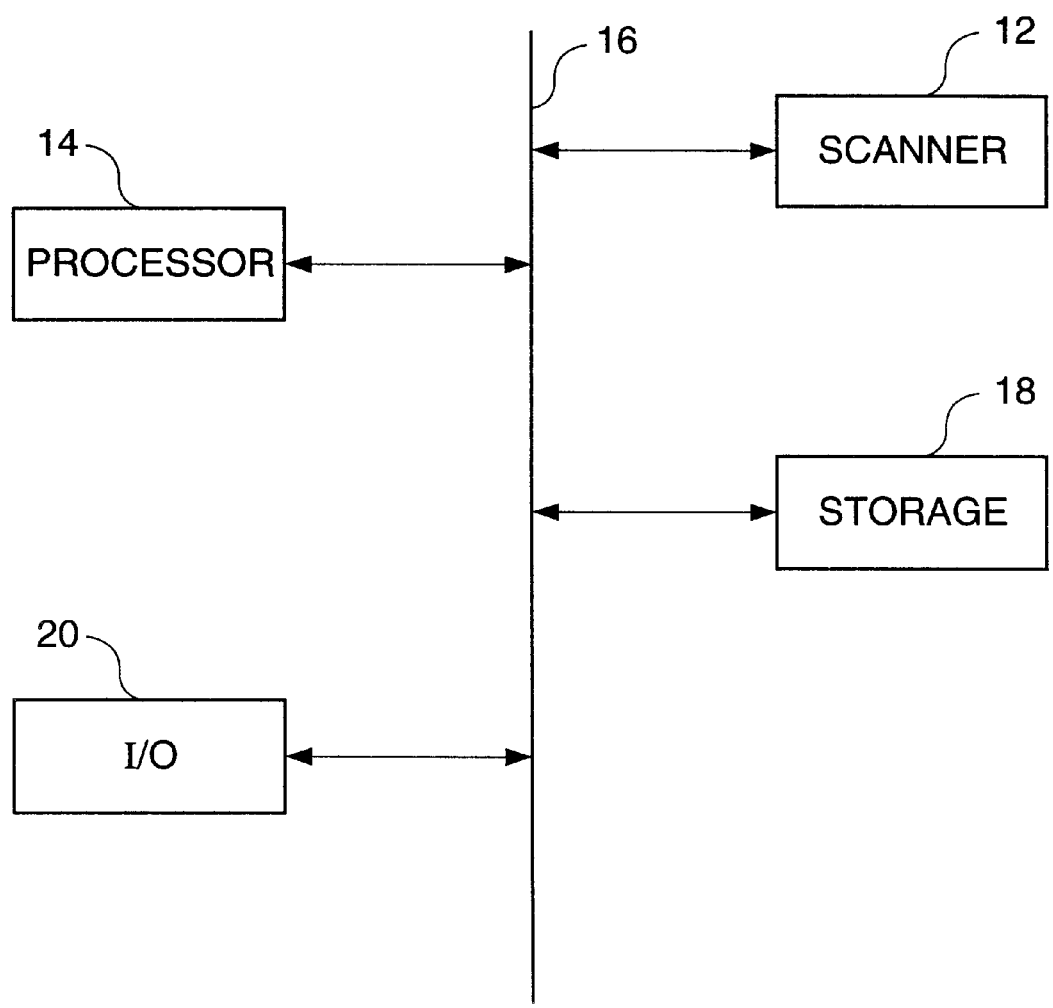
FIG. 2 is a block diagram of a system that may be used to implement a method according to the present invention.

For example, most any kind of microprocessor system could be mounted on a full size excavator, but a smaller mobile platform might require a battery operated system, or even the use of a computer system remote from the scanner 12. Thus, the components in the computer system may be connected by a bus 16, as illustrated in FIG. 2, or an alternative transmission systems, such as radio, infrared, hard-wired tether, etc. Also connected to the processor 14 will be one or more storage units 18, such as RAM for working area data storage and a hard disk or other nonvolatile memory, such as a bubble memory. Finally, input/output interface 20 may provide the results of processing according to the present invention to other components, such as another processor for performing object recognition. Alternatively, the same processor 14 may be used to process the range data according to the present invention and to perform object recognition which may be performed using conventional techniques.

As the range data is received from the scanner 12, line segments are formed 22 from neighboring points in the range data. The line segments are then merged 24 into longer line segments and an initial set of planes. An example of pseudocode for combining line segments in a scanline to form longer line segments is provided below.

Pseudocode for Linear Segmentation

```
for each point p_i scanline
    add line between p_i and p_{i+1} to list of lines L
endfor
q = empty priority queue
foreach line 1 in L
    compute the merges m_L and m_R of 1 with its neighbors
    if error(m_L) < threshold then
        add m_L to q
    if error(m_R) < threshold then
        add m_R to q
    endif
endfor
while q is not empty
    m = best merge in q
    merge lines in m and add resulting line 1 to L
    compute merges for 1 and add to q
endwhile
```

As indicated in the above pseudocode, the data points in a scanline are used to define a list of line segments connecting the data points as they are received. The linearity of each adjacent pair of line segments is calculated and if the error is less than a threshold, the possible merge is entered into a priority queue. After all possible merges of the original line segments have been calculated, the best merge in the priority queue is performed and the line segments that were merged are deleted from the list of lines and the new line is added. The process of performing the best merge in the priority queue is performed until the priority queue is empty.

The line segments that remain in the list of lines L are merged into planes. Initially, planes are formed from line segments in close proximity. Subsequently, as described below, line segments will be merged with the best fit plane. In the preferred embodiment, proximity of line segments and planes is determined by dividing the space of interest for detection of an object into cells and identifying the cells through which each of the remaining line segments passes. To simplify processing, in the embodiment set forth in the pseudocode, only two dimensions of three-dimensional range data are used. For example, the coordinates of the horizontal plane may be used to determine cell membership. Pseudocode for this purpose is set forth below.

Pseudocode for Grid Cell Membership of Lines

```
computeMembership (integer start, end)
    id P_start and P_end are in the same cell, then
        add the line to the cell
    else
        let mid = (start + end)/2
        computeMembership (start, mid)
        computeMembership (mid-1, end)
    endif
```

As indicated above for each line segment in the most recently processed scanline, the start and end points of the remaining line segments are checked to see if they are located in the same cell. If so, the line segment is added to the cell and processing continues with the next line segment until all of the remaining line segments in the most recently processed scanline have been processed. If the starting and ending points of the line segment are not in the same cell, the midpoint of the line segment is found and the process of computing membership is performed for each half of the line segment. The line segment continues to be broken into smaller and smaller pieces, until a portion of the line segment contained in a single cell is located. The identifier used for the line segment in each of the cells is the same for all portions of the line segment. Additionally, the data structure for each line segment records the cells through which the line segment passes.

The size of the cells is selected based upon a number of factors, such as the size of the space of interest, the size of the object(s) to be recognized, the resolution of the scanning equipment, etc., to optimize the speed of the algorithm. For example, for a space 7 meters wide and 14 meters deep a 10×10 array of cells in the horizontal plane could be used.

The eventual object of the present invention is to generate planes. Initially, lines in the same cell are tested to see how many line segments can be merged to form planes with an error that is within a threshold. The line segments must be from different scanlines, and are approximately parallel, e.g., forming less than a 15 degrees angle, and fairly close. In the preferred embodiment, line segments are considered close enough to merge when the vector between the line segments' centroids is projected onto the normal of each line segment and the length of at least one of the projections is less than one-half meter.

As planes are formed, the array of cells identifying the location of the line segments is updated to identify the planes as being located in the same cells through which the line segments that were merged to form the planes were located. Calculation of the error for the plane uses all three dimensions of each line, even though cell membership is determined based on only two dimensions.

For scanlines processed after the formation of the initial planes, upon completion of merging line segments and identifying the cells through which the remaining line segments pass, each line segment is merged 26 with a nearby plane having the smallest error if the error is less than a threshold. Pseudocode for performing such merges is provided below.

Pseudocode for Planar Segmentation

```
foreach scanline s
    foreach line segment 1 in s
        C = cells through which 1 passes
        P = planes passing through C
        M - empty list of merges
        compute merges of 1 and each plane in P
        if there are any merges then
            perform the best merge
        else
            L = lines passing through C
            if best merge of 1 and 1' in L has low error,
            then
                merge 1 and 1'
            else
                place 1 into table of objects
            endif
        endif
    endfor
endfor
T = empty n x n table of plane lists
foreach plane p in world
```

-continued

```
        add p to cell of T based on x and y components of
    normal
    endfor
```

As set forth above, for each line segment in the scanline, a merge is calculated for that line segment and each of the planes passing through the same cells through which that line segment passes. The best possible merge is performed, if the error is less than a threshold. If a new plane is produced by merging with a line segment (and possibly with another plane), the new plane is placed into a table of objects and the line segment and the old plane are removed. If the best merge between the line segment and the planes passing through the same cells as the line segments has an error greater than the threshold, an attempt is made to merge 32 the line segment with the other line segments passing through the same cells. The best possible merge of line segments into a plane is performed if the new plane has an error within the threshold. The new plane is placed in the table of objects and the previously existing line segment is removed from the table of objects. Otherwise, the line segment in the scanline which could not be merged with any planes or previously existing line segments, is placed in the table of objects.

If there are more scanlines 34 to be processed, processing continues as described above. After all of the scanlines have been processed, an attempt is made to merge 36 planes with similar normals if the combined plane has an error less than the threshold. The pseudocode for merging similar planes is set forth below.

Pseudocode for Merging Similar Planes

```
    function mergeSimilarPlanes
        /* ntab is a 2D array. Each cell in the array
    contains a list of planes whose normal is close to a
    specified value (different for each cell). This value
    depends on the location of the cell in the table. */
        ntab = nx by ny array of lists
        /* first, put all of the planes into ntab */
        foreach plane p in world
            n = normal of p
            /* compute i and j, the location in ntab in which p
                will be put */
            i = abs(x component of n) * (nx - 1)
            j = abs(y component of n) * (ny - 1)
            add p to list of planes in ntab[j][i]
        endfor
        /* now, loop through all planes and use ntab to find
            other planes that have similar orientations to
            the one we're looking. at merge any pairs of
            planes that are found to have low merge error */
        foreach plane p in world
            /* compute i and j, the location in ntab in which p
                will be put */
            i = abs(x component of n) * (nx - 1)
            j = abs(y component of n) * (ny - 1)
            /* look at all cells in table that are adjacent to
                cell [j][i], i.e. look at all planes with normals
                close to p's normal */
            for jj = j - 1 to j + 1
                for ii = i - 1 to i + 1
                    planeList = all planes in ntab[jj][ii]
                    for each plane p' in planeList
                        newp = p merged with p'
                        if newp has small error
                            /* update tables */
                            remove p from list of planes in world
                            remove p' from list of planes in world
                            remove p from ntab
                            remove p' from ntab
                            add newp to list of planes in world
```

-continued

```
                            add newp to ntab
                            skip to next plane p in world
                        endif
                    endfor
                endfor
            endfor
        endfor
    end function
```

As indicated above, the pseudocode for merging similar planes is like the pseudocode for merging lines and planes. A two-dimensional array is filled with planes to simplify the process of identifying planes that are likely candidates for merging. The two-dimensional array is defined in the working area provided by the storage unit 18. The number of cells in the array will depend upon how similar the planes should be to be tested for a possible merge. This in turn depends upon the threshold that is used for the error, the number of planes, the amount of noise in the range data, optimization for speed, etc. Essentially the two-dimensional array represents the angles made by the normal for each of the planes with axes in a reference plane, such as the horizontal plane used in identifying the cells through which line segments and planes pass. For example, a cell may represent a 0.1 variation in the absolute value of the X and Y components of the normal.

After the array is filled, the cells are gone through one at a time and possible merges are calculated for each plane in the cell with other planes in that cell and in the adjacent cells. As indicated in the pseudocode above, a total of nine cells are checked, because if the normal of the plane being compared with other planes is near one of the borders of the range, it may be closer to the normal of a plane in a neighboring cell than it is to any of the planes in the same cell.

In the preferred embodiment, no attempt is made to make the best possible merge. Once a combined plane with an error less than a threshold is found, the two merged planes are deleted from the list of planes and from the array of normals and the combined plane is added to the list and the normal of the combined plane is added to the array of normals. Then, the next plane in the list of planes is processed. Since new planes are added at the end of the list, when the end of the list is reached, all of the planes (including the new planes) have been processed. To make certain that there are no more possible merges of planes, the final step to attempt to merge nearby planes as set forth in the pseudocode below. This process detects planes, particularly small planes, that are in close proximity and have normals sufficiently different due to measurement errors that they are not in adjacent cells due to the level of discretization used, but the resulting merged plane has an error less than an acceptable threshold.

Pseudocode for Merging Nearby Planes

```
        /*mergeNearbyPlanes - tries to merge planes that are
            spatially close to each other, but which may have
            different normals. For small planes, the normals can
            be noisy so mergeSimilarPlanes may not try to merge
            them. However, if two small planes are close, they
            can sometimes be merged to form a larger plane with
            small error. This function operates by repeatedly
            trying to merge planes that are close to each other in
            the world. When no more merges can be performed, the
            function exits. This function is called after all
            scanlines have been processed, and after
```

-continued

```
mergeSimilarPlanes */
function mergeNearbyPlanes
    performedMerges = 1;
    /*objTable is a 2D array of cells; each cell
    contains a list of planes and lines passing through
    the cell. objTable is computed during the initial
    segmentation pass (when lines are merged to form
    planes */
    objTable = 2D array of cells
    while performed Merges = 1 performed Merges = 0
    /*loop over all cells that p passes through. These
    cells are computed earlier, when lines are merged to
    form planes. Each cell has an x and y coordinate
    which represents the center of the cell in 2D world
    coordinates (looking down from above */
        foreach cell c that p passes through
            for y = c.y - 1 to c.y + 1
                for x = c.x - 1 to c.x + 1
                    c' = objTable[y] [x]
                    for each plane p' in c'
                        newp = p merged with p'
                        if newp has small error
                            remove p from objTable
                            remove p' from objTable
                            add newp to objTable
                            performedMerges = 1
                        endif
                    endfor /* p' */
                endfor /* x */
            endfor /* y */
        endfor /* c */
    endfor /* p */
endwhile
end function
```

The array of cells used for merging lines into planes is again used to merge nearby planes after planes of similar normals have been merged. As indicated above, the process of merging nearby planes is like that of merging planes having similar normals. The difference is that the adjacent cells represent the same geographical cells used in merging lines and planes, instead of the components of normals. The process continues until no further merges occur.

Figure 3:
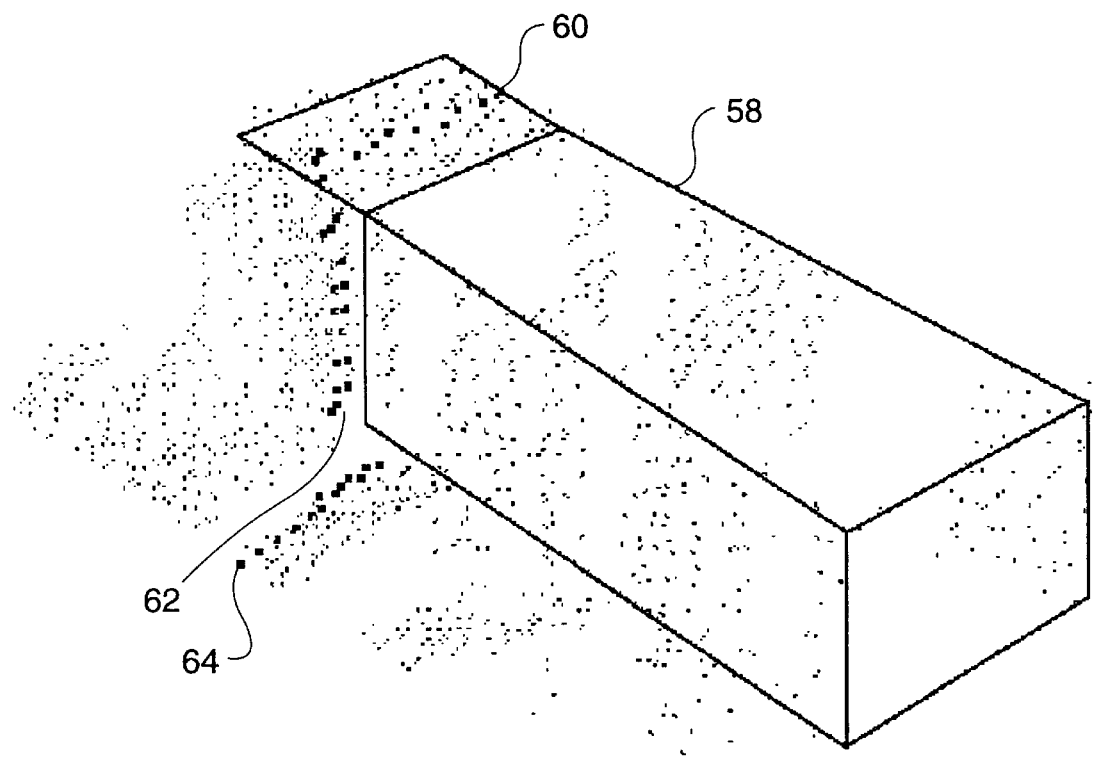
FIG. 3 is an example of range data that could result in detection of an erroneous plane.

An example is provided in FIG. 3 which shows a set of data points obtained from range data and an abstract representation 58 of the bed of the truck. The larger dots represent the data points contained in three line segments which were detected in a single scanline by the pseudocode set forth above. The points in the line segments 60, 62, and 64 would be merged into the points from the canopy of the truck, the left side of the cab, and the ground, respectively, by the pseudocode set forth above.

Figure 4:
FIG. 4 is an example of a range scan of a dump truck, taken from above.

A range scan of a dump truck is illustrated in FIG. 4. Computer code produced from the pseudocode provided above would produce planes like those indicated. These planes would be supplied to object recognition software 38 which may be conventional software that has a model of what the object to be recognized should look like. Conventionally, such object recognition software generates a hypothesis of what the planes or portions of the planes represent and a verification procedure is performed to test the hypothesis. This process is repeated until an object is recognized, or it is determined that the planes do not match any object that the software is capable of recognizing.

The many features and advantages of the present invention are apparent from the detailed specification, and thus, it is intended by the appended claims to cover all such features and advantages of the system and method which fall within the general spirit and scope of the invention. Further, since numerous modifications and changes will readily occur to those skilled in the art from the disclosure of this invention, it is not desired to limit the invention to the exact construction and operation illustrated and described. Other suitable modifications and equivalents may be resorted to, as falling within the scope and spirit of the invention.

What is claimed is:

1. A computer program embodied on a computer-readable medium for analyzing range data from scanlines, comprising:

line segmenting code to segment each scanline into a list of line segments;

computing code to divide the space associated with the range data into cells, to compute the portion of each line segment that lies in each cell, and to identify the cells through which each line segment passes;

line segment merging code to merge each line segment with other line segments in each scanline and determine a best fit plane, using the cells to determine which planes and line segments are in proximity to the other line segments;

plane merging code to merge smaller planes to create a larger plane, using the cells to determine which smaller planes are in proximity to each other; and code to determine any line segments in a scanline that cannot be merged with a plane which are compared with unmerged line segments from previous scanlines and a best possible merge is made to form a new plane if the resulting plane has an error within a threshold.

2. A computer program embodied on a computer-readable medium as set forth in claim 1, wherein line segments are formed between each pair of adjacent points defined by the range data in a single scanline, and wherein said line segment merging code further includes, prior to merging each line segment with the best fit plane, merging pairs of the line segments in each scanline provided a merged line segment error within a line threshold is produced.

3. A computer program embodied on a computer-readable medium as set forth in claim 2, wherein said line segment merging code is performed for the range data in one scanline while acquiring the range data for another scanline.

4. A computer program embodied on a computer-readable medium as set forth in claim 1, wherein said plane merging code pairs each plane with at least one of planes having similar normals and planes within a predetermined distance to form one of the combined planes having the combined plane error within the second plane threshold.

5. A computer program embodied on a computer-readable medium as set forth in claim 4, wherein said plane merging code combines the planes having similar normals by calculating a normal for each of the planes;

storing identifiers of the planes in a two-dimensional array based on components of the normal for each of the planes, with each plane in only one cell of the array; and calculating the combined plane error for each plane and all other planes in the one cell and the cells adjacent thereto to find a combined plane error within the second plane threshold.

6. A computer program embodied on a computer-readable medium as set forth in claim 1, wherein when the merged plane error produced by merging one of the line segments with the best fit plane is greater than the first plane threshold, said line segment merging code further includes merging the one of the line segments with another line segment in a previous scanline to produce a lowest possible merged plane error, if the lowest possible merged plane error is within the first plane threshold.

7. A computer program embodied on a computer-readable medium as set forth in claim 1,
   wherein said line segment merging code is executed until merging the best fit plane to each line segment would produce a merged plane error greater than the first threshold and no two line segments can be merged with a merged plane error within the first plane threshold, and
   wherein said plane merging code is executed until the combined plane error of each possible merge is greater than the second plane threshold.

8. A computer program embodied on a computer-readable medium as set forth in claim 1, wherein said line segment merging code identifies the cells through which each plane passes.

9. A computer program embodied on a computer-readable medium as set forth in claim 1, further comprising object recognition code to perform hypothesis generation and verification of at least one object formed of the combined planes resulting from completed processing of said plane merging code.

10. A method of detecting at least one object from range data in a plurality of scanlines, comprising:
   acquiring range data in a plurality of scanlines;
   dividing a space associated with the scanlines into cells;
   processing each scanline to define line segments between all pairs of points of the range data therein, to compute the portion of each line segment that lies in each cell, and to identify the cell through which each line segment passes;
   forming planes by combining line segments in different scanlines;
   merging each line segment in each scanline with a best fit plane by comparing each line segment only with the planes passing through the cell through which the line segment passes and determining if a merged plane error within a first plane threshold is produced;
   merging pairs of planes to produce combined planes if a combined plane error within a second plane threshold is produced;
   determining any line segments in a scanline that cannot be merged with a plane and comparing with unmerged line segments from previous scanlines and a best possible merge is made to form a new plane if the resulting plane has an error within a threshold; and
   performing hypotheses generation and verification of at least one object formed of the combined planes when said merging of planes is completed.

11. A method as set forth in claim 10, further comprising prior to merging each line segment with the best fit plane, merging pairs of the line segments in each scanline provided a merged line segment error within a line threshold is produced for each.

12. A method as set forth in claim 11, wherein said merging pairs of line segments is performed repeatedly for a best match of pairs of the line segments until the merged line segment error of the best match exceeds the line threshold.

13. A method as set forth in claim 11, wherein said merging pairs of planes includes
   calculating a normal for each of the planes;
   storing identifiers of the planes in a two-dimensional array based on components of the normal for each of the planes, with each plane in only one cell of the array; and
   calculating the combined plane error for each combination of each plane with all other planes in the one cell and the cells adjacent thereto to find a combined plane error within the second plane threshold.

14. A method as set forth in claim 13, wherein said merging pairs of planes further includes, after all possible merges of the line segments in all the scanlines within the first plane threshold and the pairs of planes in adjacent cells, merging pairs of planes within a predetermined distance to form additional combined planes if the combined plane error of each is within a third plane threshold.

15. A method as set forth in claim 14, further comprising, when the merged plane error produced by merging one of the line segments with the best fit plane is greater than the first threshold, merging the one of the line segments with another line segment in a previous scanline to produce a lowest possible merged plane error, if the lowest possible merged plane error is within a fourth plane threshold.

16. A method as set forth in claim 15, wherein said merging of the line segments with the planes identifies the cells through which each plane passes as the cells through which the lines merged to form the plane pass.

17. A method as set forth in claim 16, wherein said merging of the line segments together to initially form the planes is performed for the range data in one scanline while acquiring the range data for another scanline.

18. A method as set forth in claim 16, wherein said merging of the line segments with the planes is performed for the range data in one scanline while acquiring the range data for another scanline.

19. A robot vision apparatus of a robot, comprising:
   a scanner subsystem to acquire range data in a plurality of scanlines;
   at least one storage unit, coupled to said scanner subsystem, to store the range data and a computer program for analysis of the range data, and to provide a working area for analysis of the range data;
   a processor, coupled to said storage unit and said scanner subsystem, to analyze the range data by executing the computer program stored in said storage unit to define line segments between adjacent pairs of points of the range data in each scanline, to divide the space associated with the range data into cells through which each line segment passes, to merge each line segment with other line segments in each scanline, to combine the line segments to form planes, to determine a best fit plane using the cells to determine which planes and line segments are in proximity to other line segments, each plane having a first plane error within a first plane threshold, to merge pairs of the planes to form combined planes, each having a second plane error within a second plane threshold, and to produce object information, to determine any line segments in a scanline that cannot be merged with a plane which are compared with unmerged line segments from previous scanlines and a best possible merge is made to form a new plane if the resulting plane has an error within a threshold; and
   an input/output interface, coupled to said processor, said storage unit and the robot, to supply to the robot the object information resulting from the analysis of the range data.

20. A robot vision apparatus as set forth in claim 19, wherein said processor, prior to attempting to combine the line segments to form the planes, merges pairs of the line segments within each scanline to form merged line segments, each having a merged line error, provided the merged line error is within a line threshold.

21. A robot vision apparatus as set forth in claim 20, wherein said processor, prior to forming new planes by merging a pair of the line segments, merges each of unmerged line segments and the merged line segments in each scanline with a best fit plane formed during processing of previous scanlines to form a merged plane, provided the merged plane has a third plane error within a third plane threshold.

22. A robot vision apparatus as set forth in claim 21, wherein when the third plane error produced by merging one of the unmerged line segments and the merged line segments in a current scanline with the best fit plane is greater than the third plane threshold, said processor merges the one of the unmerged line segments and the merged line segments in the current scanline with one of the line segments in the previous scanlines to produce a minimum merged plane error among all of the line segments, provided the minimum merged plane error is within the first plane threshold.

23. A robot vision apparatus as set forth in claim 22, wherein said processor calculates a normal for each of the planes, to store identifiers of the planes in a two-dimensional array in the working area of said storage unit based on a component of the normal for each of the planes, with each plane in only one cell of the array, to calculate the second plane error for each combination of each plane with all other planes in the one cell and the cells adjacent thereto and to store as one of the combined planes the combination of the planes having a minimum second plane error within the second plane threshold.

24. A robot vision apparatus as set forth in claim 23, wherein after all possible merges of the unmerged line segments and the merged line segments with the best fit plane producing the third plane error within the third plane threshold have been made, and all possible merges of the line segments to form the new planes with the first plane error within the first plane threshold have been made, and all of the combined planes in adjacent cells producing the second plane error within the second plane threshold have been made, said processor merges pairs of the planes within a predetermined distance to form additional combined planes, provided each additional combined plane has a fourth plane error within a fourth plane threshold.

25. An object identification system for an autonomous vehicle, comprising:
a scanner mounted on the autonomous vehicle to acquire range data in a plurality of scanlines of an area of interest; and
a data processing system coupled to said scanner, to analyze the range data by defining line segments between all pairs of adjacent points of the range data in each scanline, combining line segments to form planes, dividing the area of interest into cells, computing the portion of each line segment that lies in each cell, and identifying the cells through which each line segment passes, merging each line segment with other line segments in each scanline, determining a best fit plane, using the cells to determine which planes and line segments are in proximity to other line segments, each plane having a first plane error within a first plane threshold, merging pairs of the planes to form combined planes, each having a second plane error within a second plane threshold, determining any line segments in a scanline that cannot be merged with a plane which are compared with unmerged line segments from previous scanlines and a best possible merge is made to form a new plane if the resulting plane has an error within a threshold, and identifying objects in the area of interest from the combined planes.

26. An object identification system for an autonomous vehicle as set forth in claim 25, wherein said data processing system merges pairs of the line segments within each scanline to form merged line segments, each having a minimum merged line error for at least one of the line segments in the pair, provided the minimum merged line error is within a line threshold and then merges each of unmerged line segments and the merged line segments in each scanline with a best fit plane formed during processing of previous scanlines to form a merged plane, provided the merged plane has a third plane error within a third plane threshold.

27. An object identification system for an autonomous vehicle as set forth in claim 26, wherein said data processing system calculates a normal for each of the planes, stores identifiers of the planes in a two-dimensional array based on components of the normal for each of the planes, calculates the second plane error for each plane in one cell and all other planes in the one cell and the cells adjacent thereto and stores as one of the combined planes a combination of the planes having a minimum second plane error within the second plane threshold.

28. An object identification system for an autonomous vehicle as set forth in claim 27, wherein after all possible merges of the line segments and the merged line segments producing the merged line error within the line threshold have been made and all possible merges of the unmerged line segments and the merged line segments with the best fit plane producing the first plane error within the first plane threshold have been made, and all of the combined planes in adjacent cells producing the second plane error within the second plane threshold have been made, said processor merges pairs of the planes within a predetermined distance to form additional combined planes, provided each additional combined plane has a fourth plane error within a fourth plane threshold.

29. A method of operating a computer system to recognize an image in a space of interest, comprising:
receiving range data in a plurality of scanlines from a scanner;
processing the range data to divide the space of interest into two-dimensional cells, to define line segments between adjacent pairs of points of the range data in each scanline, to combine line segments to form planes using the cells to determine which planes and which line segments are in proximity to other line segments by computing the portion of at least one line segment that lies within at least one cell and identifying the cells through which the at least one line segment passes, each plane having a first plane error within a first plane threshold, to merge pairs of the planes to form combined planes, each having a second plane error within a second plane threshold, determining any line segments in a scanline that cannot be merged with a plane which are compared with unmerged line segments from previous scanlines and a best possible merge is made to form a new plane if the resulting plane has an error within a threshold, and to recognize an object in the space of interest from the combined planes; and
outputting data representing the object recognized in the space of interest.

30. A method as set forth in claim 29,
wherein said processing further includes merging each line segment with a best fit plane passing through at least one of the cells through which the line segment passes if a merged plane error within a third plane threshold is produced.

31. A method as set forth in claim 30, wherein said processing to merge pairs of the planes to form combined planes comprises storing identifiers of the planes in a two-dimensional array based on components of the normal for each of the planes;

calculating the second plane error for each plane in one cell and all other planes in the one cell and the cells adjacent thereto;

storing as one of the combined planes a combination of the planes having a minimum second plane error within the second plane threshold; and merging pairs of the planes within a predetermined distance to form additional combined planes, provided each additional combined plane has a combined plane error within a fourth plane threshold.

32. A computer system for recognizing an object in a space of interest from range data provided by a scanner, comprising:

means for receiving range data in a plurality of scanlines from the scanner;

means for processing the range data to divide the space of interest into two-dimensional cells, to define line segments between adjacent pairs of points of the range data in each scanline, to compute the portion of each line segment that lies in each cell, to combine line segments to form planes using the cells to determine which planes and line segments are in proximity to other line segments by computing the portion of at least one line segment that lies within at least one cell and identifying the cells through which the at least one line segment passes, each having a first plane error within a first plane threshold, to merge pairs of the planes to form combined planes, each having a second plane error within a second plane threshold, and to recognize an image in the space of interest from the combined planes, to determine any line segments in a scanline that cannot be merged with a plane which are compared with unmerged line segments from previous scanlines and a best possible merge is made to form a new plane if the resulting plane has an error within a threshold; and means for outputting data representing the object recognized in the space of interest.

33. A computer system as set forth in claim 32, wherein said means for processing includes means for merging each line segment with a best fit plane passing through at least one of the cells through which the line segment passes if a merged plane error within a third plane threshold is produced.

34. A computer system as set forth in claim 33, wherein said means for processing comprises means for merging the pairs of the planes to form combined planes, including means for storing identifiers of the planes in a two-dimensional array based on components of a normal for each of the planes;

means for calculating the second plane error for each plane in one cell and all other planes in the one cell and the cells adjacent thereto;

means for storing as one of the combined planes a combination of the planes having a minimum second plane error within the second plane threshold; and means for merging additional pairs of the planes within a predetermined distance to form additional combined planes, provided each additional combined plane has a combined plane error within a fourth plane threshold.

\* \* \* \* \*